(12) United States Patent
Kreschel

(10) Patent No.: US 12,472,569 B2
(45) Date of Patent: Nov. 18, 2025

(54) METHOD FOR PRODUCING OR MACHINING TOOTHING

(71) Applicant: GLEASON-PFAUTER MASCHINENFABRIK GMBH, Ludwigsburg (DE)

(72) Inventor: Jürgen Kreschel, Hemmingen (DE)

(73) Assignee: Gleason-Pfauter Maschinenfabrik GmbH, Ludwigsburg (DE)

( * ) Notice: Subject to any disclaimer, the term of this patent is extended or adjusted under 35 U.S.C. 154(b) by 333 days.

(21) Appl. No.: 17/594,146

(22) PCT Filed: Mar. 27, 2020

(86) PCT No.: PCT/EP2020/058776
§ 371 (c)(1),
(2) Date: Oct. 4, 2021

(87) PCT Pub. No.: WO2020/212123
PCT Pub. Date: Oct. 22, 2020

(65) Prior Publication Data
US 2022/0168831 A1   Jun. 2, 2022

(30) Foreign Application Priority Data

Apr. 15, 2019   (DE) .......................... 102019002752.3

(51) Int. Cl.
*B23F 23/12* (2006.01)
*B23F 5/16* (2006.01)
(Continued)

(52) U.S. Cl.
CPC .......... *B23F 23/1218* (2013.01); *B23F 5/163* (2013.01); *B23Q 17/0971* (2013.01); *B23Q 17/098* (2013.01); *B23Q 17/12* (2013.01)

(58) Field of Classification Search
CPC .. B23F 23/1218; B23F 5/163; B23Q 17/0971; B23Q 17/098; B23Q 17/12
See application file for complete search history.

(56) References Cited

U.S. PATENT DOCUMENTS 3,809,870 A   5/1974 Auble et al.
4,723,219 A *  2/1988 Beyer ................ G05B 19/4067
                                              700/190
(Continued)

FOREIGN PATENT DOCUMENTS

DE         2328876 A     1/1974
DE       19948134 A1     4/2001
(Continued)

OTHER PUBLICATIONS

Machine translaton of KR101472890B1 (Year: 2014).*
(Continued)

*Primary Examiner* — Lee E Rodak
*Assistant Examiner* — Sangkyung Lee
(74) *Attorney, Agent, or Firm* — Robert L. McDowell

(57) ABSTRACT

The invention relates to a method for producing or machining a toothing (2) on a workpiece (3), in which method the workpiece, which is rotationally driven about its axis of rotation (C), is brought into rolling machining engagement with tool toothing (5) rotating about an axis of rotation (C2) which is, in particular, at a non-null crossed-axes angle to the axis of rotation of the workpiece, wherein the machining operation is automatically monitored, using sensors to record same automatically, already at the machine operation stage for a recurring irregularity originating from tool wear (52), in particular higher wear of at least one tool tooth (51) compared to other tool teeth.

18 Claims, 5 Drawing Sheets

(51) Int. Cl.
*B23Q 17/09* (2006.01)
*B23Q 17/12* (2006.01)

(56) References Cited

U.S. PATENT DOCUMENTS

| | | | |
|---|---|---|---|
| 4,849,741 A | 7/1989 | Thomas | |
| 5,904,457 A * | 5/1999 | Suwijn | B23F 23/12 409/134 |
| 6,942,436 B2 * | 9/2005 | Kakino | G05B 19/40937 700/86 |
| 2006/0264155 A1 * | 11/2006 | Kobialka | B23F 19/057 451/8 |
| 2012/0163930 A1 * | 6/2012 | Jeyaraman | G05B 19/4065 408/8 |
| 2015/0338201 A1 * | 11/2015 | Wuerfel | B23F 23/006 33/504 |
| 2019/0255635 A1 | 8/2019 | Hanni et al. | |
| 2020/0123985 A1 * | 4/2020 | Lück | F02K 3/06 |
| 2020/0361012 A1 | 11/2020 | Kreschel | |
| 2021/0162527 A1 | 6/2021 | Kreschel | |

FOREIGN PATENT DOCUMENTS

| | | | | |
|---|---|---|---|---|
| EP | 1195668 A1 * | 4/2002 | | G05B 19/4065 |
| EP | 2537615 A1 | 12/2012 | | |
| EP | 2853331 A2 | 4/2015 | | |
| EP | 3144755 A1 | 3/2017 | | |
| FR | 2695723 A1 | 3/1994 | | |
| JP | 07-088746 A | 4/1995 | | |
| JP | 2010-257010 A | 11/2010 | | |
| JP | 2018-187713 A | 11/2018 | | |
| KR | 101472890 B1 * | 12/2014 | | |
| WO | 2018/073047 A1 | 4/2018 | | |
| WO | 2019/011602 A1 | 1/2019 | | |
| WO | 2019/096542 A1 | 5/2019 | | |

OTHER PUBLICATIONS

Machine translation of EP1195668A1 (Year: 2002).*
International Search Report and Written Opinion for PCT/EP2020/058776, ISA/EPO, Jul. 13, 2020, 16 pgs.
Search Report from German Patent Office for DE 102019002752.3, Dec. 9, 2019, 12 pgs.

* cited by examiner

METHOD FOR PRODUCING OR MACHINING TOOTHING

The invention relates to a method for producing or machining a toothing on a workpiece, in which method the workpiece, which is rotationally driven about its axis of rotation, is brought into rolling machining engagement with tool toothing rotating about an axis of rotation which is, in particular, at a non-null crossed-axes angle to the axis of rotation of the workpiece. The invention also relates to a gear cutting machine designed for this purpose. Such methods are well known to the person skilled in the art, for example as gear skiving described, for example, in EP 2 537 615 A1, which document is incorporated herein by reference with regard to terminology and machining engagement of the gear skiving, wherein the gear skiving is a preferred gear machining of the invention.

When machining larger workpiece batches in particular, the tools designed with the tool toothing are replaced with new tools at regular intervals, because the machining quality falls below the desired tolerances due to progressive wear and tear of the tools. Because tool changes are at the expense of the average machining time per workpiece, an attempt is made to achieve the longest possible service life by using, for example, coatings that increase wear. Furthermore, one tries to delay the tool replacement as long as possible, i.e. not to change tools too early. This is achieved, for example, by regularly taking random samples of the workpiece gears produced, for example checking their tooth flanks for profile deviations, and then changing the tool when the deviations of the workpiece flanks from their desired ideal shape exceed a suitably set tolerance threshold.

Occasionally, tool failure, such as the breakage of a tool tooth, can also occur. Such a one-off event is detected by the monitoring mechanisms customary in modern CNC machines and an emergency stop is initiated to avoid further damage to the machine.

In spite of all such safety measures, however, it occasionally happens that, if necessary, a workpiece error is only detected in later use of the toothed workpieces and can be traced back to workpiece toothing data that are not within the desired tolerances. Even if such a discrepancy is determined before later use, e.g. a final inspection, uncertainties arise with regard to the question of whether this is due to an individual workpiece or whether workpieces preceding or following this defective workpiece could also have an effect.

In view of these difficulties, the invention is based on the object of improving a method of the type mentioned at the outset, in particular with regard to a good combination of tool life on the one hand and reliability on the other.

This object is achieved by the invention, from a methodological point of view, by a further development of the method of the type mentioned at the outset, which is essentially characterized in that the machining operation is automatically monitored, using sensors to record same, already at the machine operation stage for a recurring irregularity originating from tool wear, in particular higher wear of at least one tool tooth compared to other tool teeth. As a result of the monitoring according to the invention, it is achieved that the probability of an error for a workpiece or incorrect production of a workpiece is reduced, because information about the greatest local tool wear is already available during the machining operation. Correspondingly, suitable measures can be taken at an early stage, such as an interruption of the machining after the workpiece that has just been machined by a machining pass of the workpiece or even stopping the process immediately. The service life is increased by using up the currently used tool for as long as possible while reducing the subsequent effort if the tolerance limit for the tools is approached too closely or if it is exceeded.

In a preferred embodiment, the monitoring includes periodicities on time scales that are greater than the product of the number of teeth and the rotational speed of the workpiece. In this way, relative influences of the most worn tool tooth can be determined in a particularly suitable manner.

For this purpose, a time signal generated by the sensory detection is particularly preferably subjected to a transformation into the complementary space, in particular a Fourier transform. This facilitates the evaluation and allows the introduction of suitable and desired termination criteria.

In this context, it is preferably provided that the monitoring includes a monitoring window placed over the transformed signal. The behavior of the transformed signal is thus specifically checked in a region in which the influence of the most worn tool tooth is quantitatively most effective.

As already explained above, according to possibly variably definable termination criteria, an unchanged machining of the workpiece batch should no longer take place. Accordingly, it is provided that the monitoring system generates a warning signal if the irregularity exceeds a predetermined level. The warning signal can be selected from a class of signals representing different warning levels to which the operator can react, but also include signals to which the machine reacts automatically. For example, a machine operator can be informed in a pre-warning stage to assess the current quantitative determination of the irregularity. If only several workpieces are missing to complete a workpiece batch, the operator can decide that the workpiece batch is still to be completed and, for example, initiate a tool change before the start of the next workpiece batch. If necessary, such a decision could also be made by the machine itself using suitable algorithms. In any case, it is preferably provided that a warning signal that in any case no new workpiece is machined with the currently used tool of such a relevant stage is included.

Preferably, a criterion for the output of the warning signal and/or the selection of the warning signal from the available warning levels, more precisely, the exceeding of the irregularity on which the generation of the warning signal is based over a predetermined amount based on a predetermined threshold related to the monitoring window being exceeded by the transformed signal, is determined. The threshold could be a threshold for the transformed signal integrated into the monitoring window. In a particularly simple and yet reliable form, however, an amplitude threshold is used. The latter is naturally the first to be exceeded by the fastest growing peak in the monitoring window, so that, also in this case, the consideration of the influence of the most worn tool tooth is used in a targeted manner.

With regard to the detection of the machining operation, an acoustic signal is preferably recorded during the sensor detection. This could include, for example, a recording made using a microphone. However, structure-borne noise caused by the machining operation is preferably used and sensors such as vibration sensors/acceleration sensors are used for signal detection and are attached, for example, to the tool head carrying the tool. Usually one sensor is sufficient, but a plurality of sensors may also be used for verification or failure safety. One acceleration sensor used, for example, works according to the basic principle that a seismic mass, for example, is spring-suspended in the acceleration sensor housing and a mass position is determined when the sensor accelerates due to the inertia-related change in the mass position relative to the sensor housing, which can be measured via the spring travel. Sensors with the highest possible natural frequency are preferably used, for which purpose piezoelectric sensors are considered suitable. The physical unit of the amplitude variable detected by the sensor, for example an amplitude specified in mg (g=9.81 m/s$^2$), is not the only implementation option; the speed of the oscillation in units of, for example, mm/s could also be used. Suitable sensors are available to a person skilled in the art. Furthermore, a power value of the process could also be used as the output signal, for example the currents from the rotary drive of the tool spindle or workpiece spindle.

In the evaluation of the transformed signal, time ranges of the sensor-recorded time signal, which are recorded in at least one work pass, are preferably used in which the contact region considered over the course the toothing is larger than in a majority of the other passes. This is where the most advanced wear is recorded most effectively.

It is also provided that the relevant sensory detection takes place in one pass at least in a region that lies between the full entry of the tool toothing due to the feed rate and before it has started to exit. This increases the stability and informative value of the transformed signal. Conversely, it is also preferred that the changes in the machining intervention associated with the entry of the tool toothing with regard to axial feed are awaited before sensor measurements are included in the transformed signal. For this purpose, it is provided, for example, that the recorded time values flowing in are only recorded values when 20%, 35% or 50% of the toothing width of the workpiece is reached.

A length of the time interval on which the determination of the transformed signal is based; a recording length of at least 0.1 seconds is preferably used, but preferably at least 0.3 seconds or at least 0.5 seconds. Basically, the transformed signal is imprecise at very low frequencies due to the cutoff and in any case cannot be fully loaded with regard to the amplitudes there. However, this does not represent a major obstacle to the invention, because harmonics are also detected in the transformed signal to which an amplitude threshold value can be related with the greatest amplitude.

In a preferred embodiment, the number of teeth of workpiece and tool are commensurable or at least quasi-commensurable. Commensurable means that a greatest common factor of the number of teeth of tool and workpiece unequal to one exists, in particular an odd greatest common factor; quasi-commensurable means that this condition applies at least to fictitious numbers of teeth that deviate from the actual number of teeth by a maximum of n, with n≤⅓ of this greatest common factor. For example, the following specific embodiment with numbers of teeth 85 and 51 commensurable with the greatest common factor 17, and numbers of teeth of 53 and 83 can be reduced to this by changing each by 2 (with 2+2=4<17/3), so that there is a quasi-commensurability for this pairing. The greatest common factor is preferably 5 or greater, in particular 7 or greater.

In this context, a difference in the numbers of teeth of workpiece and tool of at least 3, in particular at least 5, in particular at least 7, is also preferred. With such conditions, lower oscillating effects with other machine frequencies and thus a clearer signal in the complementary space are achieved, which makes it easier to determine more precise threshold values.

In addition, a region of the transformed signal that is dependent on the tool rolling over in the workpiece is also included in the monitoring. The dependency can consist, for example, in the monitoring window comprising a value formed from the workpiece speed multiplied by the rollover factor, and/or at least one of the next (for example up to the fifth or sixth) harmonics of this value.

In terms of device technology, a gear cutting machine for producing or machining toothing on a workpiece, with a rotatably driven bearing for the workpiece and a rotatably driven bearing for a toothed tool and a control device for controlling a machining operation that takes place in a rolling coupling, is placed under protection and is essentially characterized by an automatic monitoring device comprising at least one sensor, which monitoring device monitors the machining operation using sensors to record same, already at the machine operation stage for a recurring irregularity originating from tool wear, in particular higher wear of at least one tool tooth compared to other tool teeth.

The advantages of the gear cutting machine according to the invention result from the above advantages of the method according to the invention. The method is also placed under protection in the form of a monitoring program stored on a data carrier.

Further features, details and advantages of the invention can be found in the following description with reference to the accompanying drawings, in which FIG. 1 is a sectional view of a peeling wheel and an internal toothing, FIGS. 2*a* to 2*c* show states of wear of a tool tooth, FIG. 3 is a representation of a transformed detection signal corresponding to FIG. 2*a,*

Figure 1:
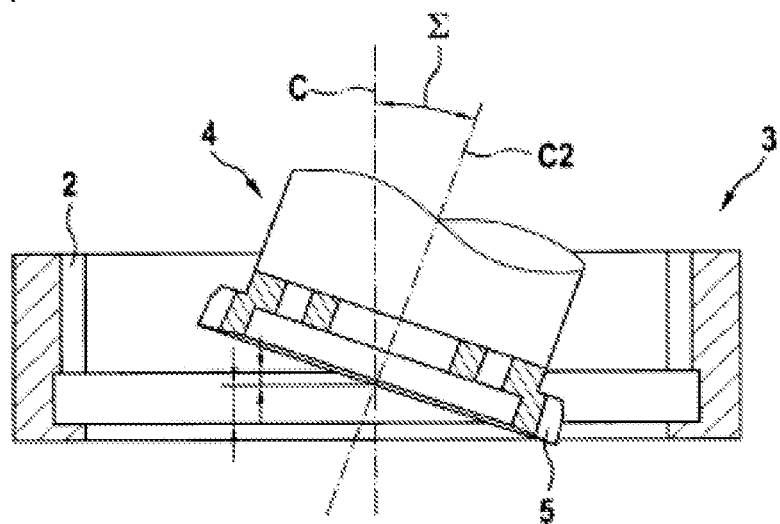

In the following, the invention is shown based on a specific example for the gear skiving of a workpiece 3 with internal toothing 2 by means of a peeling wheel 4 with tool toothing 5. As can be seen from FIG. 1, the workpiece axis of rotation C and tool axis of rotation C2 are at a crossed-axes angle Σ. In the selected representation, the machining takes place at the intersection of the axes, and the center distance axis runs orthogonally to the paper plane, but eccentric machining operations are also conceivable, as is a machining of externally toothed workpieces.

In the specific embodiment, the workpiece rotates at 353 revolutions per minute and the tool at 589 revolutions per minute, and the number of teeth on the workpiece z is 85, whereas the tool has a number of teeth z2 of 51. The numbers of teeth thus have a greatest common factor of 17, and the tool rolls over the workpiece five times, i.e. after rotating the tool five times, the same tool tooth engages again with the same workpiece tooth space. However, other commensurable or quasi-commensurable tooth number ratios could also be used.

For each workpiece revolution, all tooth spaces of the workpiece are machined with the selected tool without a jump factor, from which an engagement frequency can be calculated from the product of the number of teeth on the workpiece and the speed of the workpiece, which is 500 Hz for the specific example used.

A sensor 64 attached to the tool head of the machine in this embodiment picks up a time signal of the vibrations occurring during the machining operation. However, the sensor signal could also be detected by other sensors, as explained at the beginning. The recording can take place continuously, but in any case in periods of time that are used for further evaluation of the signal. In this embodiment of gear skiving with, for example, eight passes of increasing infeed and deeper cutting, the fifth cutting pass is selected, for example, in which the contact region between the tool toothing 5 and the workpiece toothing 2 is comparatively large, and, starting in this embodiment with the machining at the level of the center of the workpiece tooth, a signal recorded for one second is transformed by means of Fourier transform. As in this embodiment, repeated measurements can also be carried out, e.g. two to four further measurements and transformations, but preferably only values are used as long as the axial feed has not progressed so far that there is no longer a full machining engagement.

An averaged representation of the sensor signal in the complementary space is formed from the three recordings transformed in this embodiment by averaging the individual transformed signals.

Figure 2A:
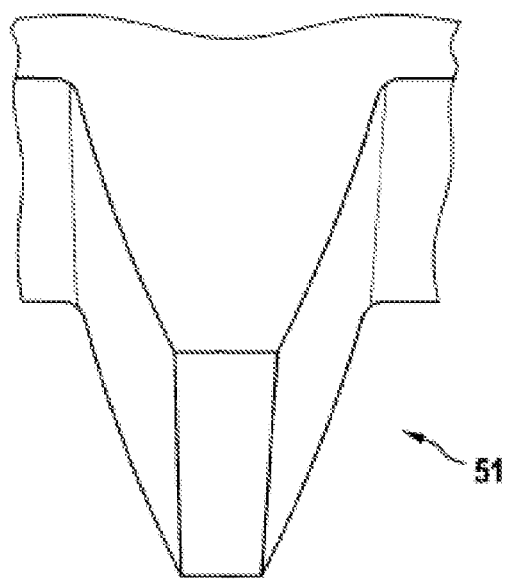
Figure 3:
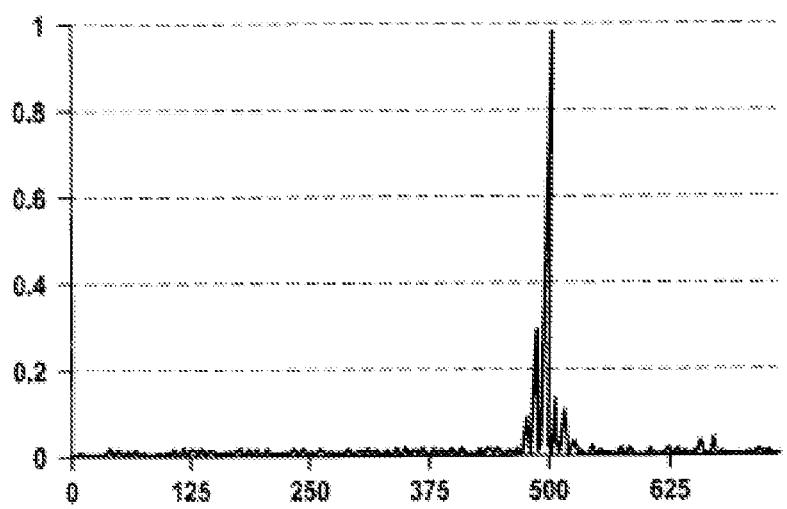

Such a signal is shown in FIG. 3, which reflects the machining carried out with a new cutting wheel (FIG. 2*a*). A peak can be seen at the aforementioned intervention frequency of 500 Hz.

Figure 2B:
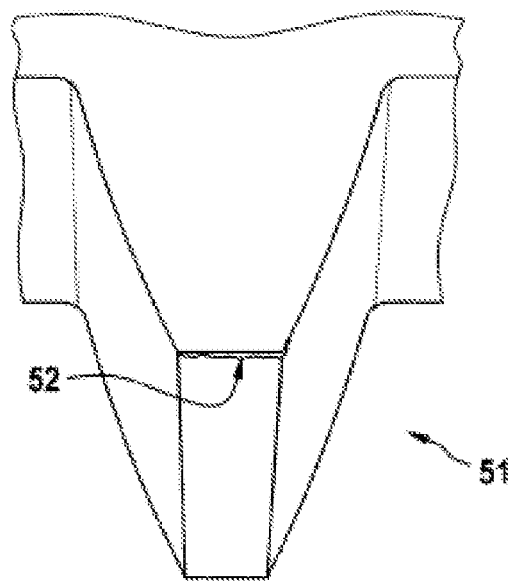
Figure 2C:
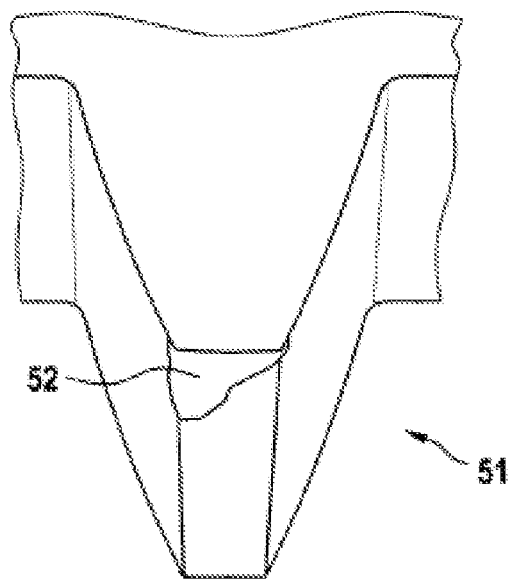

In the course of the further machining of a batch of workpieces, the tool teeth wear out, but as a rule not exactly evenly; rather, a tool tooth 51 will usually be the first on which signs of wear 52 show and in which the wear progresses fastest. This progression is shown in FIG. 2 for such a tooth, in FIG. 2*b* with wear in the range of 0.2 mm, in FIG. 2*c* with a wear of already 2 mm, which leads to machining errors in the engagement that are outside the tolerances for the manufactured workpieces.

Figure 5:
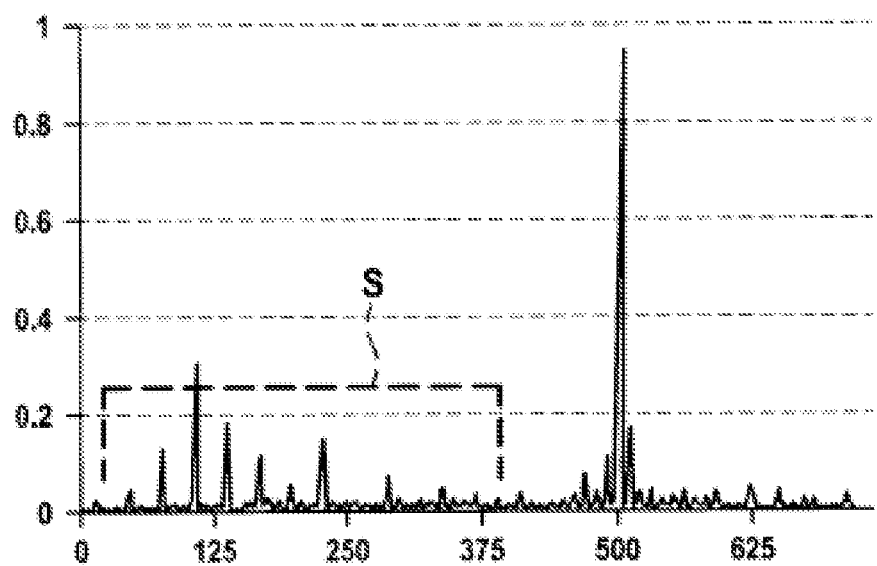
FIG. 5 is a representation of a transformed detection signal corresponding to FIG. 2*c.

By continuing the measurements and evaluations of the measurement signal described with reference to FIG. 3, rejects of workpieces caused by tool wear can be avoided, because the process of machining a batch of workpieces is interrupted when a predetermined threshold in the measurement signal is exceeded below the engagement frequency. This threshold is shown in FIG. 5 and denoted by S. In comparison, this threshold S is not yet reached in the case of a tool tooth, the wear of which is relatively the most advanced, but in absolute terms is still within the range that can be used further. On the other hand, peaks are formed, which in this embodiment mainly develop in the range of 120 (and also just under 150) Hz, and increase significantly with greater wear of this tool tooth and in some cases even exceed the peak at the engagement frequency in terms of amplitude. This can be understood from the fact that the worn tool tooth modifies a change in the tooth space shape (in the order of 1, 52, 18, 69, 35 and 1 related to it) of the tooth space of the workpiece that is there during the given roll-over, their engagement which occurs in workpiece rotation also taking place with other tool teeth, however, in the order 1, 18, 35, 52 and 69 and thus with a basic frequency of approx 29.4 Hz, which is identifiable as distance between the peaks in the monitoring window, so that the relevant monitored peaks in the specific example are those of the 4th and 5th harmonics. A monitoring window would therefore be able to be set in the range between 80 and 160 Hz in the specific embodiment, wherein other individual values can result depending on the recording time and other tooth number ratios, so that the monitoring window could be selected to be larger in order to avoid excessive individualization, for example in the range from 30 to 350 Hz or a first percentage of the engagement frequency (e.g. 5%, 10% or 15%) to a second percentage (e.g. 80%, 65% or 50%) of the engagement frequency.

Figure 4:
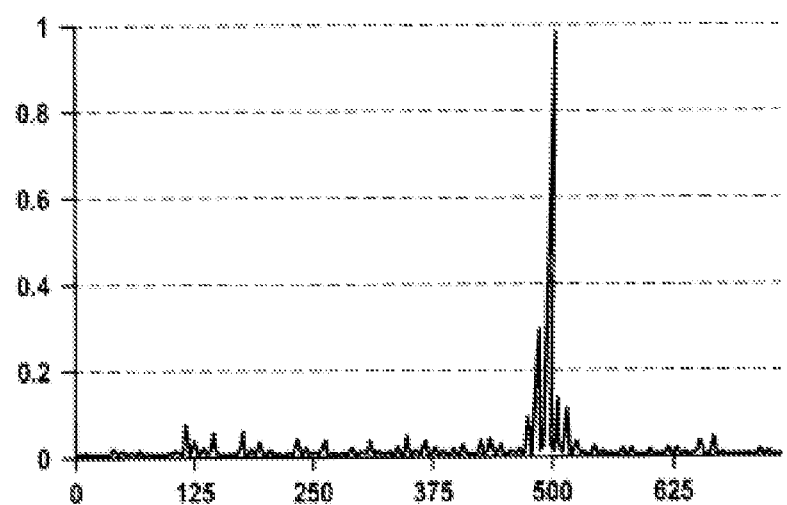
FIG. 4 is a representation of a transformed detection signal corresponding to FIG. 2*b,*

It goes without saying that the threshold level can be set to a meaningful value by predetermination. All that is required for this is test trials with tools in which a tooth is worn around the wear limit and the creation of the Fourier-transformed sensor signals shown in FIGS. 3 to 5 and explained above. A very precise criterion can thus be set up, especially for larger workpiece batches, according to which a tool change can be effected in good time but not too early and which also responds if an average wear of the tool would still be considered as sufficient for further machining.

Figure 6:
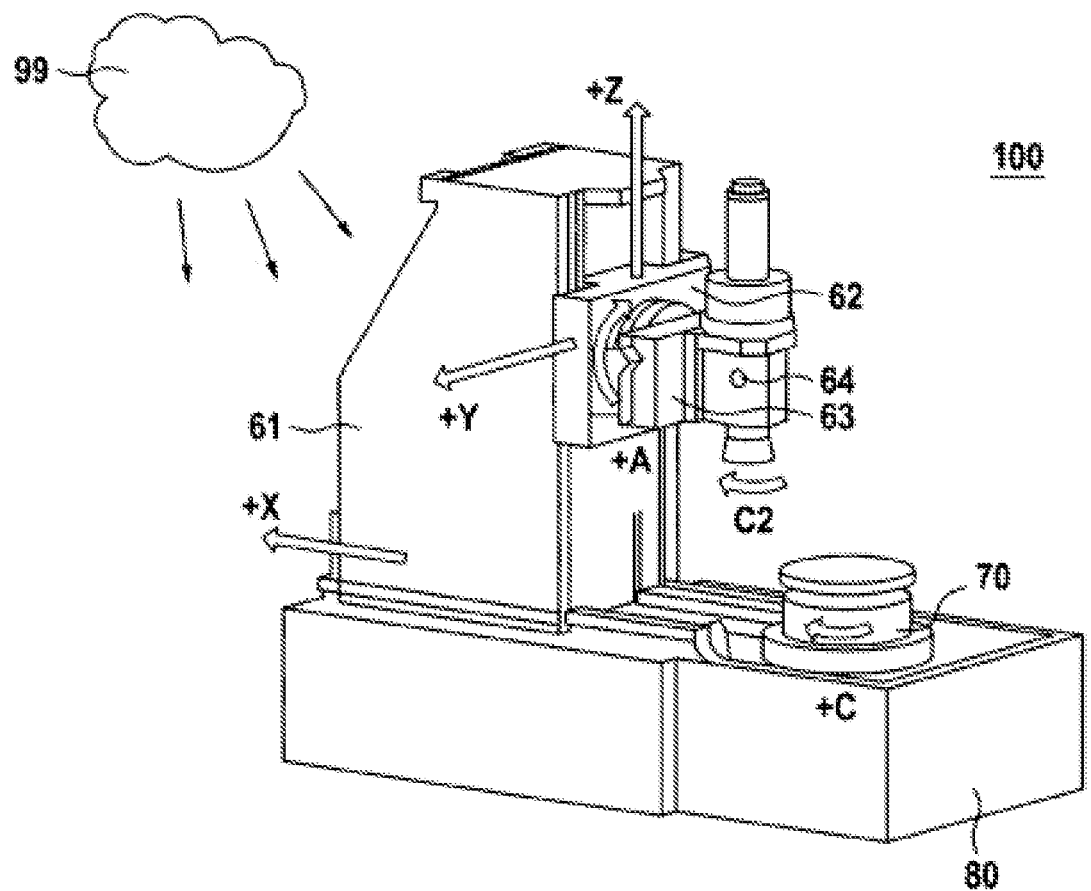
* and FIG. 6 shows a gear skiving machine.

A corresponding monitoring control could be integrated into an (overall) control 99 of the gear skiving machine shown in FIG. 6 which, otherwise, very typically has a machine bed 80 with a workpiece table 70 by which a workpiece with a clamping device (not shown) can be rotationally driven about the axis of rotation C, and on which tool-side CNC-controlled machine axes are provided in order to carry out the necessary movements for and during the machining operation. This includes a radial feed axis X, an axial feed axis Z, a pivot axis A for setting the cross-axis angle between the tool axis of rotation C2 and the workpiece axis of rotation C and a tangential axis Y, which is connected downstream of the pivot axis A in this embodiment, for eccentric machining operation settings, for example. Correspondingly, a radial slide 61 is shown in FIG. 6, which carries a vertical slide 62 on which a slide 63 with the tool head for the tool is arranged, which tool head is again linearly movable in the plane orthogonal to the radial direction X. The sensor used, for example, to detect the state of the machining operation is provided with the reference numeral 64 in FIG. 6. The time signal recorded by the sensor could also be used for other monitoring of the process.

The invention is not restricted to the specifically illustrated embodiment. Rather, the features of the above description and the following claims may be essential, individually and in combination, for implementing the invention in its different embodiments.

The invention claimed is:

1. A skiving method of producing or machining toothing on a workpiece, in which method the workpiece, which is rotationally driven about its axis of rotation (C), is brought into rolling machining engagement with tool toothing rotating about an axis of rotation (C2) which is at a non-null crossed-axes angle (2) to the axis of rotation of the workpiece, said method comprising a plurality of machining passes of said tool relative to said workpiece for producing said toothing, wherein the method further comprises,
automatically monitoring the machining operation by sensory detection comprising using sensors to record same, already at the machine operation stage, for a recurring irregularity originating from tool wear of at least one tool tooth compared to other tool teeth.

2. The method according to claim 1, in which the monitoring includes periodicities on time scales which are greater than the product of the number of teeth (Z) and the rotational speed (n) of the workpiece.

3. The method according to claim 1 in which a time signal generated by the sensory detection is subjected to a transformation in the complementary space.

4. The method according to claim 3, in which the monitoring includes a monitoring window superimposed on the transformed signal.

5. The method according to claim 3 in which the monitoring generates a warning signal if the irregularity exceeds a predetermined level.

6. The method according to claim 5, in which this exceedance is determined on the basis of a predetermined threshold(S) relating to the monitoring window being exceeded by the transformed signal.

7. The method according to claim 1 in which an acoustic signal is recorded during the sensory detection.

8. The method according to claim 1 in which the sensory detection takes place in at least one machining pass, in which a contact region between the tool and the workpiece viewed over the toothing course is larger than in a plurality of the other machining passes.

9. The method according to claim 1 in which the sensory detection takes place in one pass at least in one region which lies between a full entry of the tool toothing due to the feed rate and before it has started to exit.

10. The method according to claim 1 in which multiple recordings are made during the sensory detection, and the transforms of the plurality of recordings are averaged.

11. The method according to claim 1 in which the numbers of teeth (Z, Z2) of workpiece and tool are commensurable or at least quasi-commensurable.

12. The method according to claim 3 in which a region of the transformed signal which is dependent on the tool rolling over in the workpiece is included in the monitoring.

13. A gear cutting machine for producing or machining a toothing on a workpiece with a rotatably driven bearing for the workpiece and a rotatably driven bearing for a toothed tool and a control device for controlling a machining operation that takes place in a rolling coupling,
wherein an automatic monitoring device comprising at least one sensor which device monitors the machining operation, using sensors to record same, already at the machine operation stage for a recurring irregularity originating from tool wear of at least one tool tooth compared to other tool teeth.

14. The gear cutting machine according to claim 13 in which at least one structure-borne sound sensor is provided on the tool head forming the tool bearing.

15. The method of claim 1 wherein the tool wear comprises higher wear of at least one tool tooth compared to other tool teeth.

16. The method of claim 3 wherein said transformation comprises a Fourier transform.

17. The method of claim 10 wherein the recordings are at least 0.1 seconds in length.

18. The gear cutting machine of claim 13 wherein the tool wear comprises higher wear of at least one tool tooth compared to other tool teeth.

* * * * *